(12) United States Patent
Pavlov et al.

(10) Patent No.: US 11,465,371 B2
(45) Date of Patent: Oct. 11, 2022

(54) COMPOSITE GRID STRUCTURE

(71) Applicant: ATG EUROPE B.V., Noordwijk (NL)

(72) Inventors: Leonid Pavlov, Noordwijk (NL); Ivar Te Kloeze, Noordwijk (NL); Bart Jozef Robbert Smeets, Noordwijk (NL); Sahak Menzo Simonian, Noordwijk (NL)

(73) Assignee: ATG EUROPE B.V., Noordwijk (NL)

( * ) Notice: Subject to any disclaimer, the term of this patent is extended or adjusted under 35 U.S.C. 154(b) by 487 days.

(21) Appl. No.: 15/781,668

(22) PCT Filed: Nov. 30, 2016

(86) PCT No.: PCT/NL2016/050839
§ 371 (c)(1),
(2) Date: Jun. 5, 2018

(87) PCT Pub. No.: WO2017/099585
PCT Pub. Date: Jun. 15, 2017

(65) Prior Publication Data
US 2018/0272645 A1  Sep. 27, 2018

(30) Foreign Application Priority Data
Dec. 8, 2015  (NL) ..................... 2015927

(51) Int. Cl.
*B29C 70/30* (2006.01)
*B29C 70/34* (2006.01)
(Continued)

(52) U.S. Cl.
CPC .......... *B29C 70/304* (2021.05); *B29C 70/205* (2013.01); *B29C 70/22* (2013.01);
(Continued)

(58) Field of Classification Search
CPC ......... B29C 70/40; B29C 70/44; B29C 70/30; B29C 70/304
See application file for complete search history.

(56) References Cited

U.S. PATENT DOCUMENTS 4,715,560 A * 12/1987 Loyek .................. D03D 25/005
  428/116
5,200,251 A *  4/1993 Brand ................... B29C 53/587
  244/119

(Continued)

FOREIGN PATENT DOCUMENTS

CN  101646548 A  2/2010
CN  103895857 A  7/2014
(Continued)

OTHER PUBLICATIONS

Smeets et al. "Development and testing of equipment attachment zones for lattice and grid-stiffened composite structures." Proceedings of the 14th European Conference on Spacecraft Structures, Materials and Environmental Testing (ECSSMET) Toulouse, France. Sep. 27, 2016 (Year: 2016).*

(Continued)

*Primary Examiner* — Benjamin A Schiffman
(74) *Attorney, Agent, or Firm* — Steven M. Koehler; Westman, Champlin & Koehler, P.A.

(57) ABSTRACT

Grid structure, such as a lattice or grid-stiffened structure and a process of manufacturing such a grid structure. Fiber material is laid up on a base tool to form intersecting ribs defining a grid with a plurality of cavities. In the same step fiber material is laid to form one or more; local substructures. Blocks are placed, at the positions of the cavities. The fiber material of the ribs and. the local substructures is impregnated with a resin. Optionally, one or more layers of fiber material are placed on the base tool and/or over the ribs and the blocks to form an outer skin. The ribs, the local (Continued)

substructure and optionally the outer skin jointly consolidated to form, the grid, structure.

23 Claims, 4 Drawing Sheets

(51) Int. Cl.
| | |
|---|---|
| B32B 3/26 | (2006.01) |
| B32B 5/12 | (2006.01) |
| B29D 99/00 | (2010.01) |
| B32B 5/26 | (2006.01) |
| B29C 70/20 | (2006.01) |
| B29C 70/22 | (2006.01) |
| B32B 3/06 | (2006.01) |
| B29C 70/68 | (2006.01) |
| B32B 3/08 | (2006.01) |
| B29C 70/16 | (2006.01) |
| B29C 70/38 | (2006.01) |
| B29L 31/30 | (2006.01) |

(52) U.S. Cl.
CPC ........ *B29C 70/342* (2013.01); *B29D 99/0014* (2013.01); *B32B 3/06* (2013.01); *B32B 3/26* (2013.01); *B32B 5/12* (2013.01); *B32B 5/26* (2013.01); *B29C 70/16* (2013.01); *B29C 70/222* (2013.01); *B29C 70/38* (2013.01); *B29C 70/68* (2013.01); *B29L 2031/3076* (2013.01); *B29L 2031/3097* (2013.01); *B32B 3/08* (2013.01); *B32B 2260/021* (2013.01); *B32B 2260/023* (2013.01); *B32B 2260/046* (2013.01); *B32B 2305/076* (2013.01); *B32B 2309/68* (2013.01); *B32B 2605/18* (2013.01)

(56) References Cited

U.S. PATENT DOCUMENTS

| | | | | |
|---|---|---|---|---|
| 5,817,269 | A * | 10/1998 | Younie | B29C 33/38 264/258 |
| 6,007,894 | A * | 12/1999 | Barnes | B64C 3/20 156/184 |
| 6,245,274 | B1 | 6/2001 | Huybrechts et al. | |
| 6,520,706 | B1 | 2/2003 | Mckague, Jr. | |
| 6,638,466 | B1 | 10/2003 | Abbott | |
| 7,479,201 | B1 | 1/2009 | Wegner et al. | |
| 7,510,757 | B2 * | 3/2009 | Lee | B32B 5/12 428/172 |
| 7,871,487 | B1 | 1/2011 | Wegner et al. | |
| 7,993,727 | B2 * | 8/2011 | Sekine | B29C 70/202 428/113 |
| 8,236,124 | B1 | 8/2012 | Wegner et al. | |
| 8,435,375 | B1 | 5/2013 | Wegner et al. | |
| 9,266,303 | B2 * | 2/2016 | Fink | B29D 24/005 |
| 9,440,725 | B2 * | 9/2016 | Outon Hernandez | B29D 99/0003 |
| 10,407,150 | B2 * | 9/2019 | Dolzinski | B29C 66/472 |
| 2003/0068472 | A1 | 4/2003 | Benson | |
| 2006/0172121 | A1 | 8/2006 | Lee et al. | |
| 2009/0038744 | A1 | 2/2009 | Lee et al. | |
| 2011/0100540 | A1 | 5/2011 | Mathew | |
| 2013/0337207 | A1 | 12/2013 | Mueller et al. | |
| 2014/0170372 | A1 | 6/2014 | Fink | |
| 2015/0239209 | A1 | 8/2015 | Newton | |
| 2015/0246489 | A1 | 9/2015 | Newton | |

FOREIGN PATENT DOCUMENTS

| | | |
|---|---|---|
| GN | 103370185 A | 10/2013 |
| GN | 103560332 A | 2/2014 |
| GN | 104024105 A | 9/2014 |

OTHER PUBLICATIONS

Pavlov, Leonid, et al. "Development of mass and cost efficient grid-stiffened and lattice structures for space applications." Proceedings of the 14th European Conference on Spacecraft Structures, Materials and Environmental Testing (ECSSMET), Toulouse, France. Sep. 27, 2016. (Year: 2016).*

Pavlov, Leonid, Bart J. Smeets, and Sahak M. Simonian. "Optimization of a composite lattice satellite central cylinder structure using an efficient semi-automated approach." 57th AIAA/ASCE/AHS/ASC Structures, Structural Dynamics, and Materials Conference. Jan. 4, 2016. (Year: 2016).*

Totaro, G., and F. De Nicola. "Recent advance on design and manufacturing of composite anisogrid structures for space launchers." Acta Astronautica 81.2 (Oct. 11, 2011): 570-577. (Year: 2011).*

Vasiliev, Valery V., Vyacheslav A. Barynin, and Alexander F. Razin. "Anisogrid composite lattice structures-Development and aerospace applications." Composite structures 94.3 (Oct. 31, 2011): 1117-1127. (Year: 2011).*

Chinese First Office Action for Chinese patent application No. 2016800712709, dated Dec. 26, 2019, with English translation.

International Search Report dated Feb. 10, 2017 for corresponding International Application No. PCT/NL2016/050839, filed Nov. 30, 2016.

Written Opinion of the International Searching Authority dated Feb. 10, 2017 for corresponding International Application No. PCT/NL2016/050839, filed Nov. 30, 2016.

Third Office Action from the Chinese Patent Office for Chinese patent application No. 201680071270.9, dated May 8, 2021, filed Jun. 5, 2018, with English translation.

Supplementary search report from the Chinese Patent Office for Chinese patent application No. 201680071270.9, with English translation.

* cited by examiner

COMPOSITE GRID STRUCTURE

CROSS-REFERENCE TO RELATED APPLICATION

The present application is a national stage application of International patent application Serial No. PCT/NL2016/050839, filed Nov. 30, 2016, and published in English.

BACKGROUND

Aspects of the invention relate to a composite grid structure and to a process for manufacturing such a composite grid structure. Such composite grid structures typically comprise a grid or lattice pattern of intersecting ribs, made of a fiber reinforced composite material. Optionally, such structures may be grid-stiffened composite structures comprising a skin or shell. In some cases, a second shell or skin may be present at the tops of the ribs opposite to the first skin. Other grid structures are lattice structures without a skin.

The ribs of such a grid structure may for example run parallel in two or more directions forming a repeated pattern of rectangular, triangular, rhombic or polygonal cavities. Such grid structures combine light weight with high load bearing capacity and are for instance used in space technology.

Grid structures can for example be manufactured using expansion blocks. In such a process prepreg tows are laid on a base tool to form intersecting ribs. Expansion blocks are then placed in the cavities between the ribs. Expansion blocks are usually of a heat expandable material, such as silicone rubber or PTFE. The blocks can be separate blocks or they can be integral with a continuous base layer carrying the blocks. Optionally, prepreg material for forming a skin is laid on top of the expansion blocks. After positioning the expansion blocks the assembly is put into a vacuum bag and placed in an autoclave or oven. During the curing process the expansion blocks expand and exert a pressure force on the respective ribs. The pressure exerted by the expansion blocks shapes and compacts the ribs. After curing the expansion blocks are allowed to cool and shrink and are removed.

Alternative processes of manufacturing grid structures include dry fiber infusion processes and filament winding processes. In both cases, first the blocks are placed, then the tows forming the ribs are laid in grooves between the blocks. With dry fiber infusion the assembly is then infused with a resin and cured. With filament winding, the tows are wetted before placing them in the grooves.

Although grid structures provide excellent overall stiffness and strength, grid structures are unsuitable for connection to other structures or local load introduction, since any modification required for such connections or load introduction would require additional material to be added through a subsequent manufacturing process, or it would disturb the grid and decrease the load bearing capacity and mechanical properties of the structure.

It is an object to provide a grid structure allowing more complex uses, e.g., such that it can be connected to one or more other structures without compromising the load bearing capacity and manufacturability of the structure.

SUMMARY

A process is provided for manufacturing a grid structure, wherein fiber material, such as dry fibers or prepreg tows, is laid on a base tool to form intersecting ribs defining a grid with a plurality of cavities, while in the same step fiber material, such as dry fibers or prepreg plies, is laid to form one or more local substructures. In an earlier or later step blocks are placed at the positions of the cavities. In an earlier or later step the fiber material of the ribs and the local substructures is impregnated with a resin. Optionally, one or more layers of fiber material are placed on the base tool and/or over the ribs and the blocks to form an outer skin. The ribs, the local substructure and optionally the outer skin are jointly consolidated, e.g, by curing, to form the grid structure.

It has been found that jointly consolidating or curing local substructures with the rest of the structure makes it possible to manufacture grid structures that enable optimized load introduction and that can be connected to other structures. Moreover, the process is cost efficient and not time-consuming since the structure is built up in a single lay-up phase and consolidated in a single step. This removes the need for subsequent lay-up or curing operations.

In this respect, local substructures are structures not forming part of the grid pattern or the skin, designed to enable local introduction of an external load and/or to reinforce the ribs and/or the skin locally. The local substructures can for example include reinforcement structures, such as patches on the skin, e.g., around an opening or cut-out, or they can include load introduction structures connecting to one or more adjacent ribs or a load introduction structure at the structure's edge adapted for coupling the structure to a further structure.

The ribs and the substructures are made of multiple plies or layers of fiber reinforced composite material. The fiber material used for the ribs are typically longitudinal tows of unidirectional fiber material. A ply or layer can comprise one or more tows. The fiber material used for the substructures can be any suitable type of fiber material, such as woven composite plies, unidirectional sheets or stitched ply stacks, or any other suitable types. Combinations of different fiber materials can also be used.

The fiber material may for example comprise glass fibers, carbon fibers, aramid fibers, high modulus fibers, ultra high modulus fibers or mixtures thereof. The fiber material may be a dry fiber material, a prepreg material impregnated with a curable or thermoplastic resin or a material wetted with resin. Suitable resins include but are not limited to—epoxy, cyanate ester, polyester or bismaleimide resins, or thermoplastic resins, such as PEI or PEEK.

The skin is also made of a fiber material, such as one or more layers of an fabric and/or differently oriented layers of impregnated unidirectional material, which may be an impregnated prepreg material. The resin of the skin is typically the same resin type as the resin of the ribs and the local substructures.

In general a very good load transfer is achieved if ends of the tows forming the ribs are interwoven with the layers forming the local substructures. The amount of overlap between the plies of the ribs and the plies of the local substructures can be tailored for each specific application and load case. In practice, the overlap may for example be at least 1 mm, e.g., at least 3 mm.

In a particular embodiment, the local substructure comprises a laminate edge with a section with a thickness gradually increasing towards a row of terminal ends of the intersecting ribs. Such a laminate edge section can effectively be used to optimize load introduction, e.g., where the structure is attached to a further load bearing part. The terminal ends of the ribs may for example be at a distance from an outer edge of the grid-structure, the outer edge being formed by extending plies of the laminate edge section. If a skin is present the section of gradually increasing thickness may then form a gradual transition from the outer skin to the outer laminate edge. The tapering or build-up rate and/or the thickness of the laminate edge section can be optimized for specific load distribution patterns. In practice a suitable build-up rate would for example be 2-20, i.e., for 1 mm thickness with every 4-20 mm length.

To avoid stress concentrations at the transition between the ribs and the laminate edge section, the intersecting ribs can be provided with ends near the laminate edge section which are leveled with the laminate edge section.

Tows of the intersecting ribs terminate in the laminate edge section. As a result, the positioning and orientation of the plies of the laminate edge section is independent on the grid pattern and can be optimized for its specific application and load transfer pattern. For instance, at least a part of the layers of the rib overlap layer ends of the laminate edge section and form an inclined stack of interwoven layer ends. In a specific embodiment of the inclined stack, the overlapping parts of the layers of the rib gradually drop off, such that higher ply ends extend beyond lower ply ends, while the overlapped ply ends of the laminate edge section gradually build up, such that lower ply ends extend beyond higher ply ends. The angle of inclination of the stack of interwoven layer ends relative to the surface of the laminate edge section may be any suitable angle between 0 to 90 degrees, in practice it will be at most about 70 degrees, e.g., at most about 45 degrees, e.g., at most about 30 degrees, e.g., at most 20 degrees, e.g., at most 15 degrees.

Bringing down the height of the ribs to the level of the laminate edge section can be done by dropping plies, e.g., with ply ends of higher plies overlapping ply ends of lower plies. The dropping of plies of the rib and their positioning is independent on the build-up of the laminate edge section and hence can be done prior to reaching the region of the laminate edge section and/or at a build-up section of the laminate section. The drop rate of plies of the rib and hence the build-down rate of the rib can be linear or non-linear. Practical drop-off rates would for example be within the range of 20 to 2, i.e., 0.2-2.5 mm rib height reduction per 5 mm rib length. Other drop-off rates can also be used, subject to engineering considerations.

The laminate edge section can for example be used for an adhesive connection to a further part. Alternatively, or additionally, openings and or recesses may be provided in the laminate edge section after curing, e.g., perpendicular to the laminate edge section and/or within the plane of the laminate edge section. These openings can be used with mechanical fastening means, such as bolts.

During curing compaction pressure is exerted onto the laminate edge section, e.g., by the base tool or mandrel and/or by an insert tool. Such an insert tool can for example be made of a metal, a composite, a ceramic material, a salt or other mineral-based material, or of an expandable material, such as silicon rubber. A hard tooling material, such as a metal, would improve surface quality of the resulting structure. A hybrid tool of an expandable material with a thin metal top layer smoothening the tool's surface can also be used.

The local substructures may also comprise a patch, such as a skin thickening patch adjacent a cut-out in the skin, e.g., surrounding such a cut-out, or on any other part of the grid structure. Such a patch may for example comprise one or more prepreg plies. The patches can be co-cured with the rest of the structure in a one-shot process.

The patch or patches can for example be applied at the rib side of the skin and/or at the opposite side of the skin. In the latter case, a tooling plate, such as a base tool or a caul plate, can be used with a recess tailored to accommodate material for the one or more skin thickening patches. For instance, the prepreg of the skin, including the patch, can be laid directly on the tooling plate, with the patch in the recess. Alternatively the patch is placed on the tooling plate and subsequently the tooling plate is carefully positioned on the uncured structure in such a way that the patch is exactly within the matching recess.

The local substructures can also comprise a local rib interfacing substructure. For example, it may comprise a rib interfacing structure bridging two adjacent ribs. For instance, prepreg layers are laid upon the base tool to form such a rib interfacing structure. One or more of the prepreg layers forming the rib interfacing structure can be interwoven with the prepreg tows forming the adjacent ribs. Such a rib interfacing structure may for example be built of plies extending into the ribs alternated with plies not extending into the ribs. The fraction of plies that extend into the rib is variable and depends on the design in order to produce a rib interfacing structure with a desired thickness with optimal load transfer into the ribs. The plies of the rib interfacing structure may for example extend into the ribs over a distance, which may for example be equal to at least the half of the rib's width or less than half of the rib's width.

The local rib interfacing substructures can for example be used to connect the structure to another structure, e.g., by adhesive bonding and/or by mechanical fastening. The local rib interfacing substructures may for example be provided with one or more openings or recesses, e.g., for use with mechanical fastening means. By positioning such openings in a local rib interfacing substructure the fiber material in the ribs and the nodes remains uninterrupted. Optionally, such openings can be reinforced by a bonded bushing or insert, optionally provided with a male or female thread. Optionally, such an opening extends only through a part of the thickness of the local rib interfacing substructure.

The rib interfacing structure may have any suitable shape, size or thickness. The thickness may vary, e.g., gradually or stepwise. The rib interfacing structure may fill the complete cavity between the adjacent ribs, or only part of it, or may extend beyond rib height on either side. Optionally, multiple attachment holes can be provided in a single local substructure. Optionally, two or more local substructures can be placed in a single cavity.

The grid structure can for example be a flat panel or a body of revolution, such as a cylinder or cone, or a section of such a body, with an outer skin and/or an inner skin or without a skin.

Optionally, the disclosed process can be carried out by first laying the skin on the base tool and by subsequently building the ribs on the skin. Alternatively, it can be done the other way around: first positioning the ribs and the expansion blocks and then laying the skin on top of it. The latter option is particularly suitable for producing bodies of revolution.

A grid structure of a layered composite material comprising a grid of ribs includes one or more load introduction structures between at least some of the ribs, the load introduction structure having one or more layers with layer ends extending between layers of one or more adjacent ribs. As set out above, the load introduction structure may for example include a laminate edge section with a thickness gradually increasing towards a row of terminal ends of the intersecting ribs. In a specific embodiment, layers building the intersecting ribs gradually built off in the direction of laminate edge section, for example in such way that the terminal ends of the intersecting ribs are leveled with the laminate edge section.

For instance, at least a part of the layers of the rib overlap layer ends of the laminate edge section and form an inclined stack of interwoven layer ends. In a specific embodiment, the overlapping parts of the layers of the rib gradually drop off, while the overlapped parts of the layers of the laminate edge section gradually build up.

Other load introduction structures may include at least one structure in a cavity bordered by intersecting ribs, said structure interfacing at least one of the intersecting ribs, as disclosed above.

BRIEF DESCRIPTION OF THE DRAWINGS

Aspects of the invention are further explained with reference to the accompanying drawings, showing exemplary embodiments.

DETAILED DESCRIPTION

Figure 1:
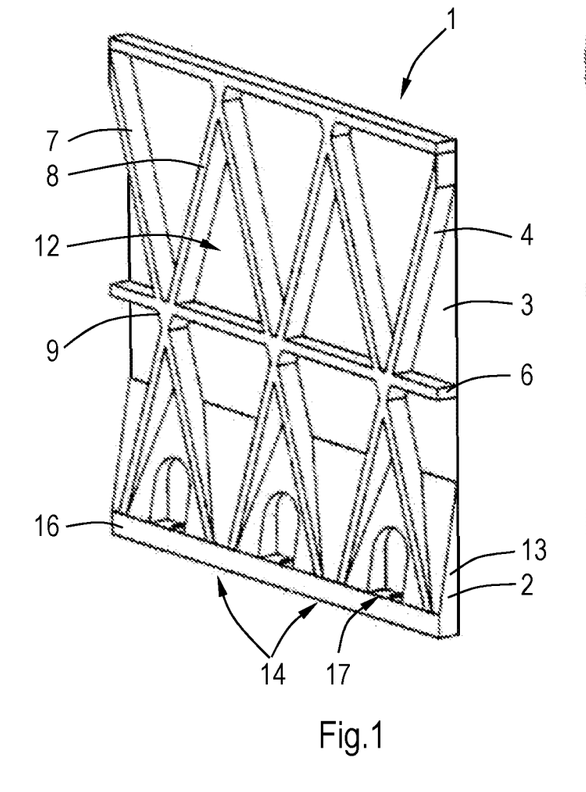
FIG. 1: shows an exemplary embodiment of a grid-stiffened composite structure.

FIG. 1 shows an exemplary embodiment of a grid-stiffened composite structure 1 with a local substructure 2. The structure 1 comprises a shell or skin 3 reinforced by a grid 4 of regularly spaced intersecting ribs 6, 7, 8 running in three directions. The ribs 6, 7, 8 intersect at nodes 9 and form a repeated pattern of triangular cavities 12. Alternative embodiments may be designed with any other suitable grid patterns, including—but not limited to—anisogrid patterns.

In this exemplary embodiment of FIG. 1 the local substructure 2 is a laminate section 13 with a thickness gradually increasing towards a row of terminal ends 14 of the ribs 7, 8.

At the terminal ends 14 of the ribs 7, 8 the height of the ribs has been levelled with the laminate section 13. Here the section of gradually increasing thickness is continued as a laminate edge 16 of substantially even thickness. The local substructure 2 forms a load introduction edge provided with openings 17 for mechanical fastening means (not shown). Due to the gradual thickening of the laminate section 13 loads exerted via the fastening means are distributed over the grid structure, while stress peaks and concentrations are minimized. Alternatively, the load introduction edge 16 can be used for attachment via an adhesive bond, in which case the openings 17 would no longer be required. The edge 16 and the section 13 gradually guide any bending, tensile, shear and compression loads into the grid structure.

Figure 2:
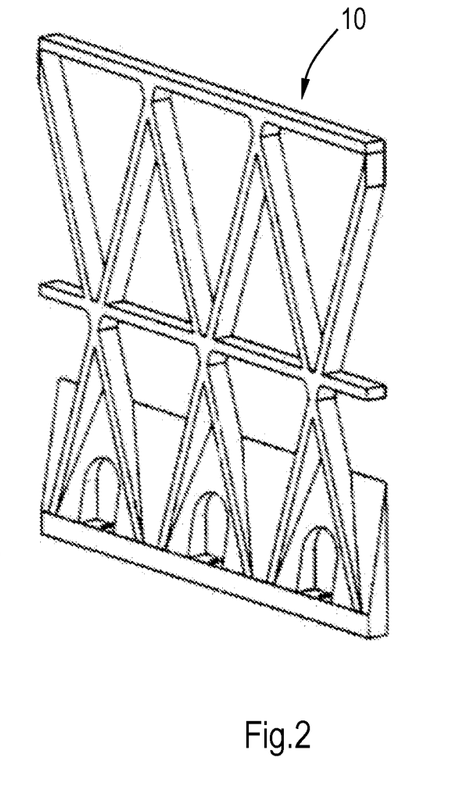
FIG. 2: shows an exemplary embodiment of a lattice structure.

FIG. 2 shows an alternative embodiment of a grid stiffened structure 10, which is identical to the structure 1 of FIG. 1, except that the structure 10 is a lattice without a skin 3.

Figure 3:
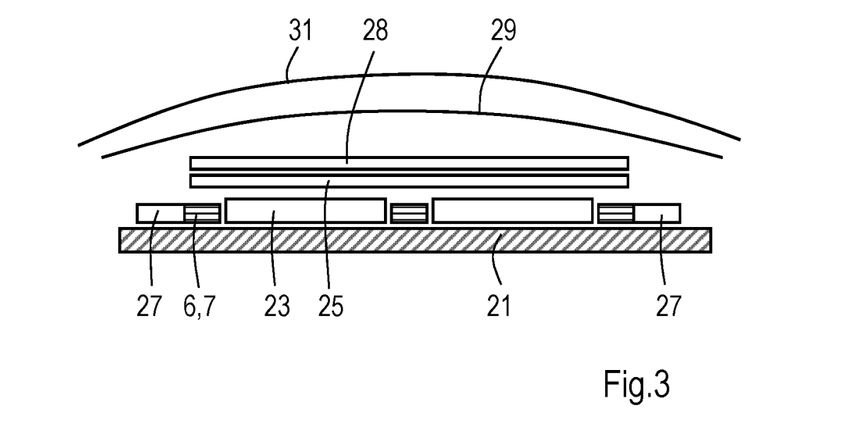
FIG. 3: schematically shows a process for manufacturing the structure of FIG. 1.

FIG. 3 shows schematically how the structure 1 of FIG. 1 can be manufactured by means of a one-shot curing process. First, a base 21 is prepared by applying a release film or release agent over its surface. In a next step tows of uncured prepreg material are laid on top of each other to form the intersecting ribs 6, 7, 8 in the desired grid pattern. Also the tows forming the local substructures 13, 16 (not shown in FIG. 3) are laid with ends being interwoven with the tows forming the intersecting ribs 6, 7, as will be explained hereafter. Due to the tackiness of the tows, the tows stay attached on top of each other.

In a next step, expansion blocks 23 are positioned in the cavities 12 between the ribs 6, 7, 8. Then a skin 25 is placed covering the grid 4 and the expansion blocks 23.

To ensure the dimensional stability of the structure 1 during curing a stiff frame 27 is built at the edges of the grid 4 to keep the ribs 6, 7, 8 straight, if the grid composite structure 1 is a panel or other non-cylindrical structure.

A caul plate 28 is then put on top of the skin 25 and a breather fabric 29 is placed over the assembly. In a next step the resulting assembly is put into a vacuum bag 31 and positioned in an autoclave or oven (not shown).

During cure the expansion blocks 23 expand and compact the ribs 6, 7, 8 to define the final shape and dimensions of the ribs 6, 7, 8. During compaction the height of the ribs increases and the ribs become tall enough to co-cure with the skin. The skin 25, the ribs 6, 7, 8 and the local substructures 13, 16 are jointly cured to form durable cohesion between the local reinforcements structure 13, 16, the skin 25 and the grid 4. After cure the expansion blocks 23 are removed from the structure 1.

Figure 4A:
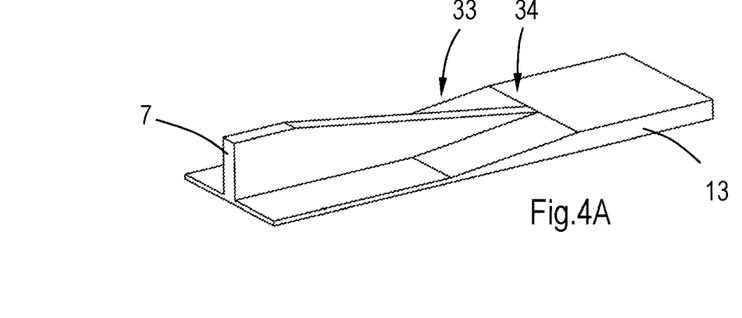
FIG. 4A: shows in detail a rib end and a laminate edge section of the structure of FIG. 1.
Figure 4B:
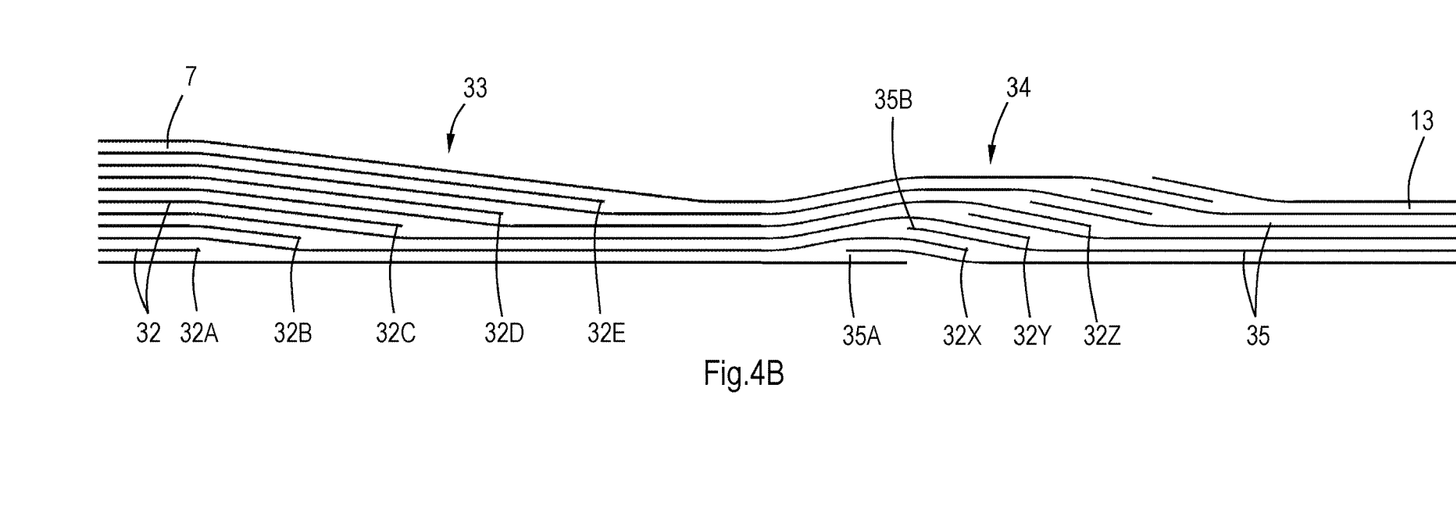
FIG. 4B: shows the build-up of plies at the midplane cross section of the section shown in FIG. 4A.

FIG. 4A shows in detail a section where a terminal end of a rib 7, 8 meets the laminate section 13. FIG. 4B shows schematically a cross section along a vertical midplane of the detail shown in FIG. 4A. The rib 7 is built-up with a stack of plies 32. In a first transition zone 33, part of the plies are terminated. In this transition zone 33 lower terminated ply ends 32A are terminated at more distance from the laminate section 13 than next higher terminated ply ends 32B, gradually leveling the height of the rib 7 with the surface of the laminate edge section 13. The terminated ply ends 32A, 32B 32C, 32D are alternately laid between plies that extend into the laminate edge section 13 to form a second transition zone 34. Optionally, multiple plies can be terminated at a single point in a single layer. In the second transition zone 34, plies 32 of the rib 7 gradually drop-off with higher ply ends 32Z extending beyond lower ply ends 32Y to define a linear—or optionally a non-linear—drop-off rate. Plies 35 of the laminate edge section 13 are gradually built-up, with lower ply ends 35A extending beyond higher ply ends 35B with a build-up rate corresponding to the drop-off rate of the rib plies 32 in second transition zone 34. During curing the transition zone 34 will be compressed and become leveled with the surface of the laminate edge section 13.

The ply ends 32 of the rib 7 extending into the second transition zone 34 are interwoven with the ply ends 35 of the laminate section 13. The overlapping ply ends of the rib 7 and the laminate edge section 13 in the second transition zone 34 form an inclined stack of interwoven layer ends. The angle of inclination a of the stack relative to the surface of the laminate edge section may be any suitable angle between 0 to 90 degrees, in practice it will be less than about 70 degrees, e.g., less than about 30 degrees, e.g., less than 15 degrees.

Figure 4C:
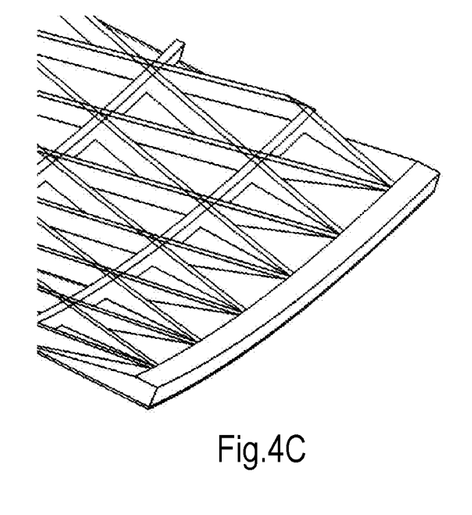
FIG. 4C: shows a third exemplary embodiment.
Figure 4D:
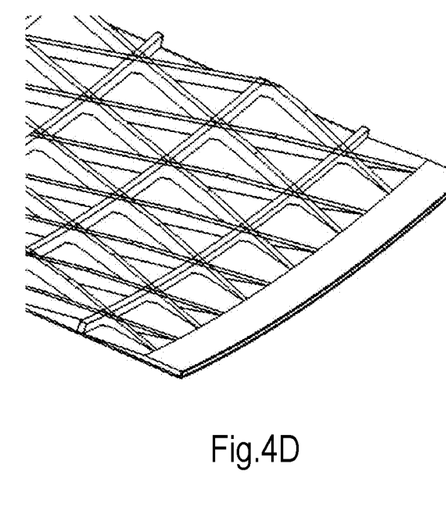
FIG. 4D: shows a fourth exemplary embodiment.

In FIGS. 4A and 4B the rib plies 32 start to drop-off prior to entering the laminate section 13. This may result in a structure shown in FIG. 4C. Alternatively, the ply ends of the rib 7 may end in a section where the laminate section is already fully builtup. An example of such a structure is shown in FIG. 4D.

Figure 5A:
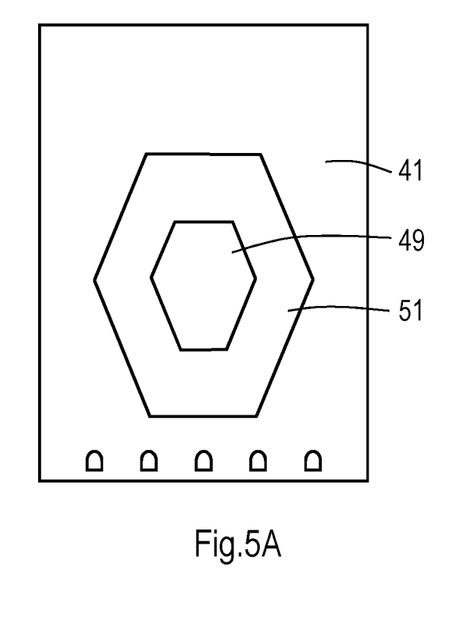
FIG. 5A: shows in front view a local substructure of a fifth embodiment.
Figure 5B:
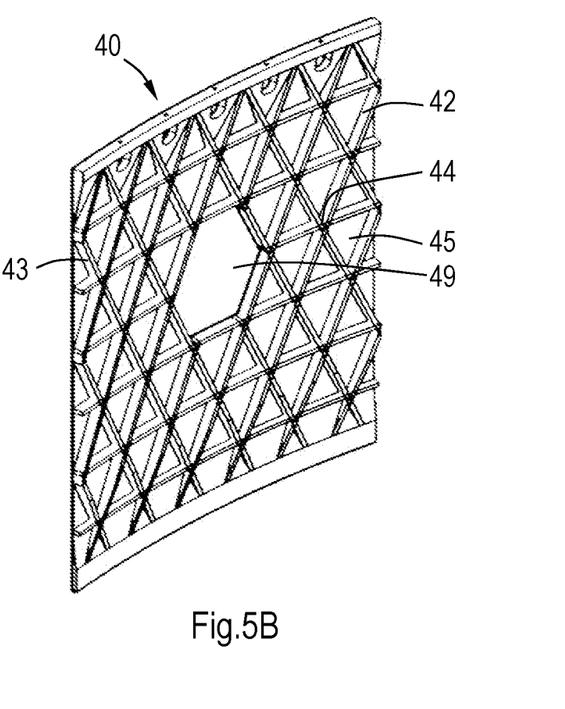
FIG. 5B: shows the structure of FIG. 5A in perspective rear view.

FIGS. 5A and 5B show a section of a further exemplary embodiment of a grid-stiffened composite structure 40 in front view (skin-side; see FIG. 5A) and rear view (rib-side; see FIG. 5B), respectively. The grid stiffened structure 40 has a skin 41 and intersecting ribs 42, 43, 44 defining a regular grid pattern with triangular cavities 45 at a rib-side of the skin 41. The grid pattern is interrupted by a central hexagonal cut-out 49 bordered by intersecting ribs 42, 43, 44. At the side opposite to the rib-side a patch 51 is applied on the skin 41 bridging ribs at the outline of the cut-out 49 with adjacent ribs. The patch 51 is formed by a single ply of prepreg material, or by more plies if so desired. In the shown embodiment, the patch 51 completely surrounds the cut-out 49. In an alternative embodiment the patch may for example only partly border a cut-out. It has been found that in a wide variety of cases such a patch 51 suffices to maintain the buckling resistance close to the same level as the undisturbed grid-stiffened structure.

Figure 6:
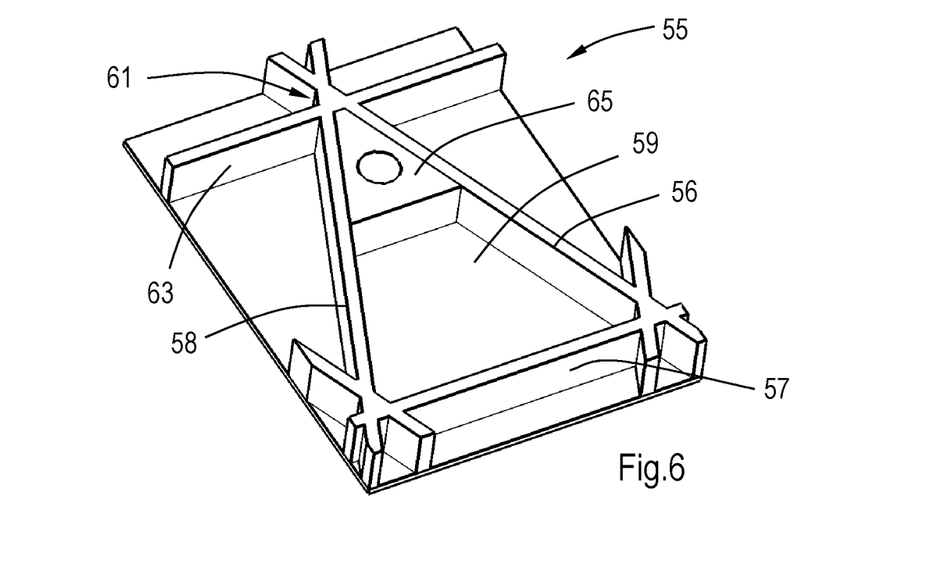
FIG. 6: shows a local substructure of a sixth embodiment.

A further type of local substructure is shown in FIG. 6 with a section of a grid-stiffened structure 55. Three intersecting ribs 56, 57, 58 intersect at nodes 61 and define a triangular cavity 59. A fourth rib 63 crosses one of the nodes 61. At this node 61 the cavity 59 is provided with a local rib interfacing substructure 65 locally bridging the two intersecting ribs 56, 58. In this exemplary embodiment the local substructure 65 is a load introduction structure provided with an opening, e.g., for cooperation with mechanical fastening means.

Figure 7:
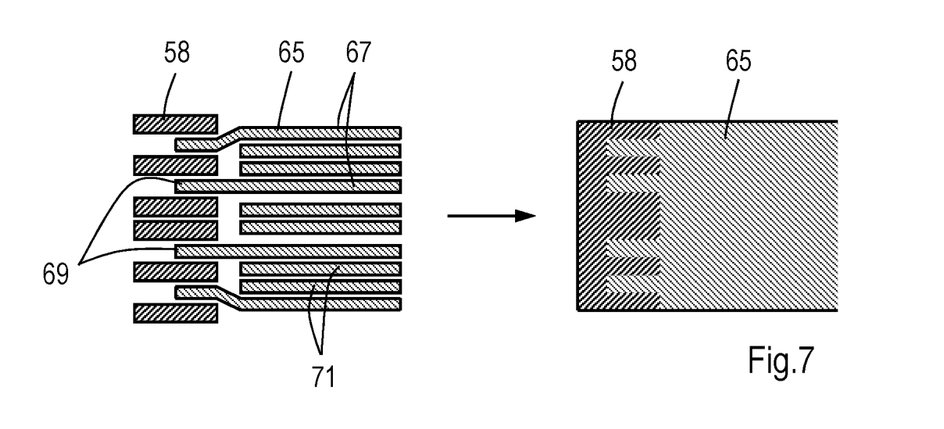
FIG. 7: shows a schematic cross-section of the structure of FIG. 6.

The local rib interfacing substructure 65 is formed by stacking tows or plies 67, similar to the build-up of the ribs. The tows or plies 67 forming the local substructure 65 have ends 69 interwoven with those of the adjacent ribs 56, 58, as is shown in FIG. 7 (showing one of the two ribs only, before and after compaction and curing). In the local substructure 65 every ply 67 extending into the ribs 58 is between two pairs of plies 71 not extending into the ribs 58. The amount of plies extending into the ribs may be varied subject to engineering considerations.

Figure 8:
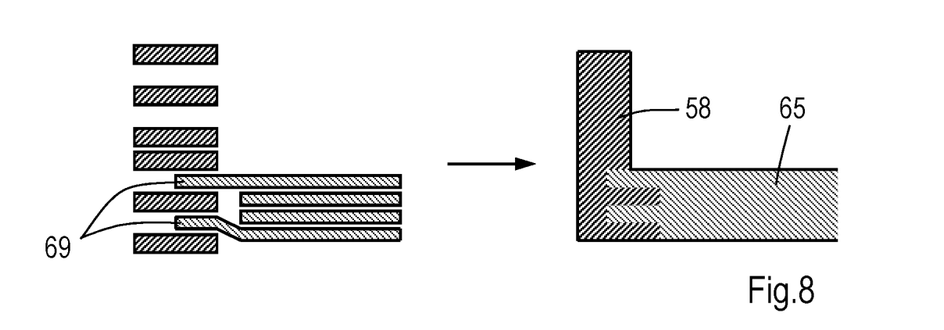
FIG. 8: shows a similar cross section as FIG. 7 of a different embodiment.

In FIGS. 6 and 7 the local substructure 65 has about the same height as the ribs 56, 57, 58, 63. Alternatively, the local substructure 65 may have a smaller height, as shown for example in FIG. 8.

The invention is not restricted to the above described embodiments which can be varied in a number of ways within the scope of the claims.

The invention claimed is:

1. A process of manufacturing a grid structure of a layered composite material comprising fibers and resin, the process comprising:
    laying multiple layers of fiber material on top of each other upon a base tool to form intersecting ribs defining a grid pattern with a plurality of cavities, each portion of each intersecting rib having a desired height, and laying additional layers of fiber material to form one or more local substructures extending from the grid pattern, wherein, at a plurality of levels along the height of one or more of the ribs, parts of the layers of fiber material forming the one or more ribs are interwoven with portions of the additional layers of fiber material forming an adjacent one of the local substructures;
    impregnating the fiber material of the ribs and the local substructures with a resin; and
    consolidating the ribs and the local substructures jointly to form the grid structure.

2. The process according to claim 1, wherein the fiber material forming the ribs comprises prepreg tows and the fiber material forming the local substructures comprises prepreg plies.

3. The process according to claim 1, wherein laying the fiber material includes laying the fiber material such that at least one of the one or more local substructures comprises a laminate edge section with a thickness gradually increasing towards a row of terminal ends of the intersecting ribs.

4. The process according to claim 3, wherein laying the fiber material includes laying the fiber material such that terminal ends of the ribs are at a distance from an outer edge of the grid structure, the outer edge being an outer laminate edge formed by extending plies of the gradually thickening laminate edge section.

5. The process of claim 4, wherein laying the fiber material includes laying the fiber material such that the intersecting ribs have ends near the laminate edge section which are leveled with the outer laminate edge.

6. The process of claim 4 and further comprising after curing providing connection structures in the outer laminate edge.

7. The process according to claim 4, wherein consolidation includes exerting a compaction pressure onto the outer laminate edge.

8. The process of claim 3 wherein laying the fiber material includes laying the fiber material such that layers of the intersecting ribs terminate in the laminate edge section.

9. The process of claim 8, wherein laying the fiber material includes laying the fiber material such that layers of the ribs overlap lower tows to gradually reduce a height of the ribs.

10. The process according to claim 1, wherein the one or more local substructures include one or more patches.

11. The process of claim 10, wherein the patches patches comprise one or more plies.

12. The process of claim 10, wherein a tool is used with a recess tailored to accommodate material for the one or more patches.

13. The process according to claim 1, wherein laying the fiber material includes laying the fiber material such that tows or plies are stacked to form the one or more local substructures, wherein ends of at least some of the tows or plies forming the local substructures are interwoven with tows forming an adjacent rib.

14. The process of claim 13, wherein laying the fiber material includes laying the fiber material such that the local substructure bridges adjacent ribs.

15. A process of manufacturing a grid structure of a layered composite material comprising fibers and resin, the process comprising:
    laying multiple layers of fiber material on top of each other upon a base tool to form intersecting ribs defining a grid pattern with a plurality of cavities, each portion of each intersecting rib having a desired height, and laying additional layers of fiber material to form one or more local substructures extending from the grid pattern, wherein, at a plurality of levels along the height of one or more of the ribs, parts of the layers of fiber material forming the one or more ribs are interwoven with portions of the additional layers of fiber material forming an adjacent one of the local substructures;

placing blocks at positions of the cavities;

impregnating the fiber material of the ribs and the local substructures with a resin; and consolidating the ribs and the local substructures jointly to form the grid structure.

16. The process according to claim 15, wherein laying the fiber material includes laying the fiber material such that the one or more local substructures include a laminate edge section with a thickness gradually increasing towards a row of terminal ends of the intersecting ribs.

17. The process according to claim 16, wherein laying the fiber material includes laying the fiber material such that layers building the intersecting ribs gradually build off in a direction of the laminate edge section.

18. The process according to claim 17, wherein laying the fiber material includes laying the fiber material such that terminal ends of the intersecting ribs are leveled with the laminate edge section.

19. The process according to claim 15, wherein laying the fiber material includes laying the fiber material such that the local substructures include at least one structure in a cavity bordered by intersecting ribs, said structure interfacing at least one of the intersecting ribs.

20. The process according to claim 15 and further comprising placing one or more layers of fiber material on the base tool and/or over the ribs and the blocks to form an outer skin.

21. The process according to claim 20 wherein consolidating includes consolidating the ribs, the one or more local substructures and the outer skin jointly to form the grid structure.

22. The process of claim 16, wherein laying the fiber material includes laying the fiber material such that at least a part of the layers of the rib overlap layer ends of the laminate edge section, wherein the overlapping parts of the layers of the rib gradually drop off, while the overlapped parts of the layers of the laminate edge section gradually build up.

23. The process according to claim 22, wherein laying the fiber material includes laying the fiber material such that the overlapping parts form an inclined stack of interwoven layer ends with an angle of inclination relative to the surface of the laminate edge section of at most about 70 degrees.

* * * * *